United States Patent
Slavicek et al.

(10) Patent No.: US 9,916,373 B2
(45) Date of Patent: Mar. 13, 2018

(54) DYNAMIC DATA PARTITIONING EXTENSION

(71) Applicant: Red Hat, Inc., Raleigh, NC (US)

(72) Inventors: Pavel Slavicek, Brno (CZ); Rostislav Svoboda, Rosice (CZ)

(73) Assignee: RED HAT, INC., Raleigh, NC (US)

( * ) Notice: Subject to any disclaimer, the term of this patent is extended or adjusted under 35 U.S.C. 154(b) by 386 days.

(21) Appl. No.: 14/669,106

(22) Filed: Mar. 26, 2015

(65) Prior Publication Data

US 2016/0283572 A1  Sep. 29, 2016

(51) Int. Cl.
*G06F 17/30* (2006.01)

(52) U.S. Cl.
CPC .... *G06F 17/30584* (2013.01); *G06F 17/3033* (2013.01); *G06F 17/30339* (2013.01)

(58) Field of Classification Search
None
See application file for complete search history.

(56) References Cited

U.S. PATENT DOCUMENTS

| | | | |
|---|---|---|---|
| 6,223,182 B1 * | 4/2001 | Agarwal | G06F 17/30595 |
| 7,822,781 B2 | 10/2010 | Greene et al. | |
| 7,870,174 B2 * | 1/2011 | Eadon | G06F 17/30486 |
| | | | 707/953 |
| 8,577,941 B2 | 11/2013 | Li | |
| 8,892,509 B2 | 11/2014 | Cattell et al. | |
| 2007/0016558 A1 * | 1/2007 | Bestgen | G06F 17/3053 |
| 2014/0330767 A1 | 11/2014 | Fowler | |
| 2014/0337276 A1 | 11/2014 | Iordanov | |
| 2015/0026208 A1 | 1/2015 | Kuhmuench | |

FOREIGN PATENT DOCUMENTS

WO    WO 2004/040399 A2    5/2004

OTHER PUBLICATIONS

Oracles® "Understanding Application Development" http://docs.oracle.com/middleware/1212/toplink/OTLOG/app_dev.htm#OTLCG94272, 2015, 24 pages.
Miki Enoki et al., "Memory-Efficient Index for Cache Invalidation Mechanism with OpenJPA" http://link.springer.com/charter/10.1007/978-3-642-35063-4_55, Lecture Notes in Computer Science vol. 7651, 2012, 4 pages.
Dirk Bartels et al., "Creating High Performance Big Data Applications with the Java Persistence API" http://www.slideshare.net/Datavers ity/creating-high-performance-big-data-applications-with-the-java, 2015, 20 pages.

* cited by examiner

*Primary Examiner* — Belix M Ortiz Ditren
(74) *Attorney, Agent, or Firm* — Haynes & Boone LLP (57) ABSTRACT

Methods, systems, and computer program products are included for defining a partitioning strategy corresponding to an attribute, creating tables and inserting data into the tables according to the partitioning strategy, detecting triggering events, and responsive to the triggering events, dynamically activating tables for storing data.

20 Claims, 5 Drawing Sheets

DYNAMIC DATA PARTITIONING EXTENSION

BACKGROUND

The present disclosure relates generally to databases, and more particularly to methods and systems for partitioning data into database tables.

Enterprise applications work with huge amounts of data. Typically, data corresponding to an entity (e.g., orders, customers, employees, and so forth) is stored in a single table. The amount of data stored in a table directly impacts the performance of the storage system. Accordingly, as the amount of data stored in a table increases, access to the table becomes less efficient.

BRIEF SUMMARY

According to an example, a computer-implemented method includes defining a plurality of subsets corresponding to an attribute. The method further includes creating a first table in a database, the first table corresponding to data values that are members of a first subset of the plurality of subsets. The method further includes receiving a first insert statement, the first insert statement including a first data value that is a member of the first subset. The method further includes transforming the first insert statement into a transformed first insert statement. The method further includes executing the transformed first insert statement to insert the first data value into the first table. The method further includes receiving a second insert statement, the second insert statement including a second data value that is a member of the first subset. The method further includes detecting a trigger event corresponding to the first table. The method further includes based on the detecting, creating a second table in the database, the second table corresponding to data values that are members of the first subset. The method further includes transforming the second insert statement into a transformed second insert statement. The method further includes executing the transformed second insert statement to insert the second data value into the second table.

According to an example, a non-transitory computer-readable medium includes computer-readable instructions, the computer-readable instructions executable by a processor to cause the processor to: receive a first insert statement, the first insert statement including a first data value that is a member of a first subset. The computer-readable instructions are further executable to transform the first insert statement. The computer-readable instructions are further executable to insert the first data value into a first table. The computer-readable instructions are further executable to detect a trigger event corresponding to the first table. The computer-readable instructions are further executable to create a second table, the second table corresponding to data values that are members of the first subset. The computer-readable instructions are further executable to receive a second insert statement, the second insert statement including a second data value that is a member of the first subset. The computer-readable instructions are further executable to transform the second insert statement. The computer-readable instructions are further executable to insert the second data value into the second table.

According to an example, a system includes a processor and a memory. The system further includes an enterprise application that is executed by the processor, the enterprise application including a business key functionality module. The system further includes the business key functionality module to define a plurality of subsets corresponding to an attribute. The system further includes a database including a first table, the first table corresponding to data values that are members of a first subset of the plurality of subsets. The system further includes a dynamic partition layer, the dynamic partition layer to receive a first insert statement, the first insert statement including a first data value that is a member of the first subset. The system further includes the dynamic partition layer to transform the first insert statement. The system further includes the dynamic partition layer to detect a trigger event corresponding to the first table. The system further includes the database including a second table, the second table corresponding to data values that are members of the first subset. The system further includes the dynamic partition layer to receive a second insert statement, the second insert statement including a second data value that is a member of the first subset. The system further includes the dynamic partition layer to transform the second insert statement.

BRIEF DESCRIPTION OF THE DRAWINGS

Various examples of the present disclosure will be understood more fully from the detailed description given below and from the accompanying drawings of various examples of the disclosure.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
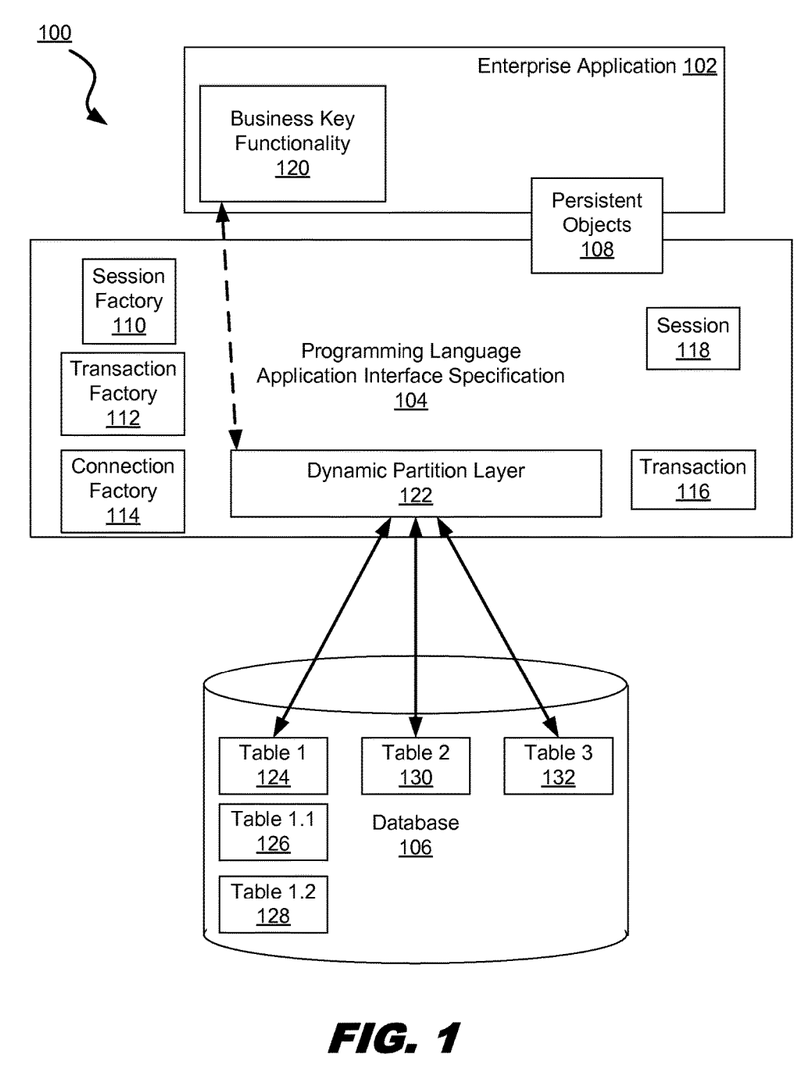
FIG. 1 is a block diagram illustrating a system architecture for dynamically partitioning a database, in accordance with various examples of the present disclosure.

FIG. 1 illustrates a system architecture 100 for dynamically partitioning a database, in which examples of the present disclosure can be implemented.

System architecture 100 includes an enterprise application 102, a programming language application interface specification 104 and a database 106. The enterprise application 102, programming language application interface specification 104 and database 106 may be structured as software components, hardware components or a combination of both.

In the present example, the enterprise application 102 is an application that is deployed onto an application server. Examples of enterprise applications include, and are not limited to, automated billing systems, payment processing systems, content management, human resources management and so forth.

In the present example, the programming language application interface specification 104 is an application programming interface such as JAVA PERSISTENCE API (JPA), which describes the management of relational data. The programming language application interface specification 104 is communicatively coupled to the enterprise application 102.

The enterprise application 102 may create, manage, update and otherwise access persistent objects 108. In some examples, persistent objects 108 include instances of entity classes.

For example, the enterprise application 102 may be used to manage customer data in a transaction. In this example, a customer instance may be constructed as an object. Using JPA, this may be performed using the following code, or a variant thereof: Customer firstCustomer=new Customer ("John", "Smith"). A transaction may then be triggered using the instance. Using JPA, this may be performed using the following code or a variant thereof: em.getTransaction( ).begin( ). The instance may be set to persist, as a persistent object. Using JPA, this may be performed using the following code or a variant thereof: em.persist(firstCustomer). Accordingly, the persistent object may be stored in a database using transactions. Using JPA, this this may be performed using the following code or a variant thereof: em.getTransaction( ).commit( ). Accordingly, because the programming language application interface specification 104, in this example JPA, is used as the interface for managing the object, the persistent object is also illustrated as part of the programming language application interface specification 104.

In the present example, the programming language application interface specification 104 also includes specifications for managing sessions, transactions, and connections. Session factory 110 is structured for managing session instances. Transaction factory 112 is structured for managing transaction instances. Connection factory 114 is structured for managing connection instances. Session 118 represents a list of sessions. Transaction 116 represents a list of transactions.

In the present example, the database 106, is communicatively coupled to the programming language application interface specification 104, such that data values corresponding to the enterprise application is accessed in the database 106, such as by storing the data values, querying the data values, deleting the data values and so forth. The database 106 may include any type of database, such as one or more flat files, SQL databases, XML databases, and variants and combinations thereof.

Business key functionality 120 is structured to configure a strategy for partitioning data in the database 106. In the present example, the partitioning strategy includes defining which attributes to use as keys, and defining how to partition data values corresponding to the attributes. For example, data values corresponding to an attribute may be defined as having subsets, with data values being partitioned into a subset based on the data matching a rule. In some examples, the partitioning strategy is specified in the business key functionality 120 using code that conforms to the programming language application interface specification 104, and implemented in the data partition layer 122 using a hash table structure.

In the present example, the dynamic partition layer 122 is structured as an extension that adds additional functionality to the programming language application interface specification 104. For example, the dynamic partition layer 122 may be a JPA extension. In the present example, the dynamic partition layer 122 defines the interface used by the business key functionality 120 for configuring the partitioning strategy. Accordingly, the business key functionality 120 is communicatively coupled to the data partition layer 122. The dynamic partition layer 122 may include a cache, for storing data corresponding to the partitioning strategy defined by the business key functionality 120.

The partitioning strategy is implemented by the dynamic partition layer 122, which is structured to receive and transform statements prior to their execution. For example, a create table statement, insert statement or delete statement may be transformed according to the partitioning strategy that is defined by the business key functionality 120 and implemented by the dynamic partitioning layer 122. Tables 1, 1.1, and 1.2 (elements 124, 126 and 128, respectively) are an example of vertical partitioning. Tables 1, 2 and 3 (elements 124, 130 and 132, respectively) are an example of horizontal partitioning. Each of the tables represents a table that is created in the database 106 according to the partitioning strategy.

For example, the enterprise application 102 may be structured to store orders for various departments. The partitioning strategy may be defined such that a table is created for each department, where each table stores the orders associated with the particular department. The partitioning of the orders for each department into separate tables is an example of horizontal partitioning. In this example, table 1 (element 124) is defined as for storing orders associated with the first department, table 2 (element 130) is defined as for storing orders associated with the second department and table 3 (element 132) is defined as for storing orders associated with the third department. The first department may have a large number of orders. Accordingly, as the number of orders for the first department are detected to meet or exceed preconfigured thresholds, new tables 1.1 and 1.2 (elements 126 and 128, respectively) are created to store orders corresponding to the first department. The partitioning of the orders within a department into separate tables is an example of vertical partitioning.

Figure 2:
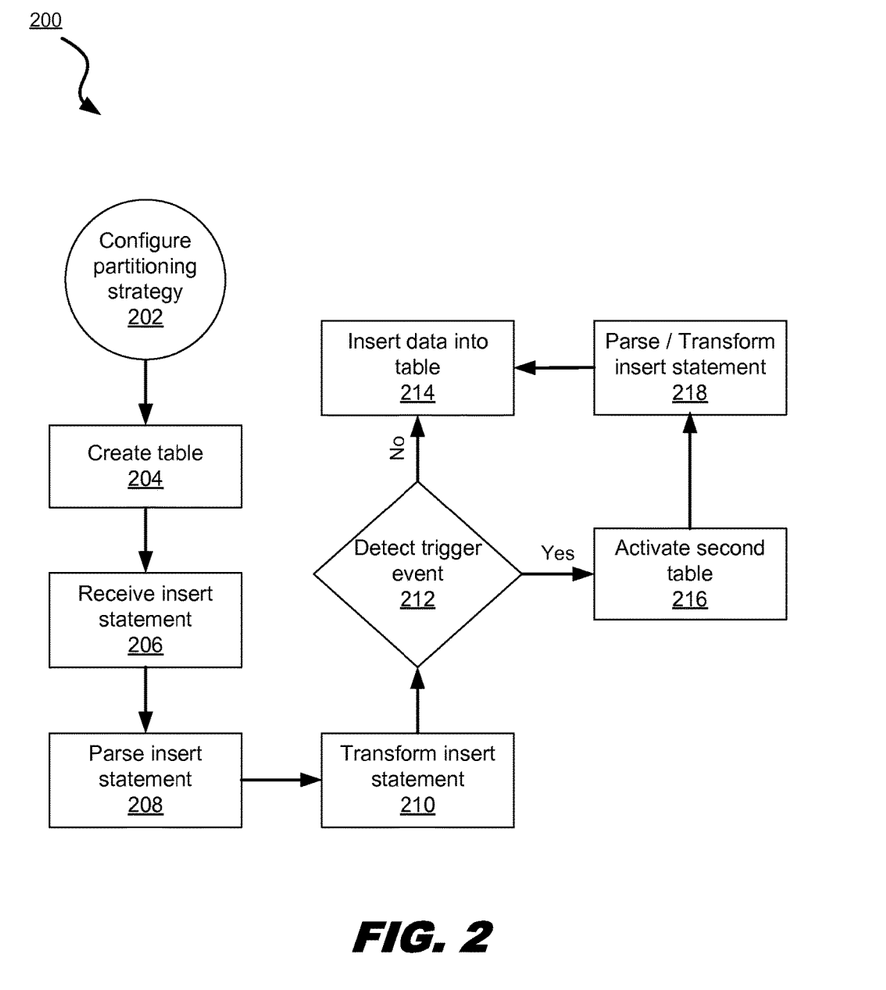
FIG. 2 is a flow diagram illustrating a method for inserting data into a database, in accordance with various examples of the present disclosure.

FIG. 2 is a flow diagram illustrating a method for inserting data into a database, according to some examples of the present disclosure. The method 200 may be performed by processing logic that may comprise hardware (e.g., circuitry, dedicated logic, programmable logic and microcode), software (such as instructions run on a computer system, specialized hardware, dedicated machine, or processing device), firmware, or a combination thereof. The method may be performed for software components in serial or in parallel.

At block 202, a partitioning strategy is configured. In the present example, a user may specify a strategy, using the business key functionality, for partitioning data according to an interface as defined by a dynamic partition layer. In the present example, the business key functionality and dynamic partition layer are provided as an extension of an existing implementation. Using the business key functionality, the user specifies a partitioning strategy by defining which attributes are keys, and subsets into which the key attributes are partitioned. For example, if a key attribute is a customer surname, the partitioning strategy for the attribute may be to define twenty-six subsets of the attribute, with each subset corresponding to a letter of the alphabet. Accordingly, a surname beginning with a letter of the alphabet may be defined as corresponding to a particular table (surnames beginning with "a" being assigned to a first table, surnames beginning with "b" being assigned to a second table and so forth). This is an example of horizontally partitioning the data. In another example, a partitioning strategy may be based upon the date of an order. For example, twelve subsets may be defined for an order attribute, with each subset corresponding to a month. Accordingly, an order from January may be defined as corresponding to a first table, and an order from February may be defined as corresponding to a second table.

At block 204, tables are created according to the partitioning strategy. In the present example, a table is created for each subset of each attribute that is assigned as a key. For example, if a surname attribute is defined as a key, and the surname is defined to have twenty-six subsets, then twenty-six tables are created. In other examples, instead of creating a table for each subset prior to storing data values, the tables are created on an as-needed basis as the data values are inserted.

At block 206, the enterprise application attempts to insert data values into the database, causing an insert statement to be received at the data partition layer. The insert statement includes data values to insert and the attributes to which those data values correspond. For example, if the insert statement is an SQL statement, the syntax may appear as follows: INSERT INTO Customers (LastName) VALUES ('Smith'), with "Smith" being the data value and "LastName" being the attribute.

At block 208, the insert statement is parsed to identify one or more attributes included in the insert statement and one or more data values corresponding to the attributes. The parser identifies attributes that are defined as keys, and data values corresponding to those attributes, in the insert statement. Accordingly, for the above example syntax, the parser identifies "LastName" as an attribute and "Smith" as the data value corresponding to the attribute.

At block 210, the insert statement is transformed according to the partitioning strategy. Any subsets corresponding to the parsed attribute are determined. In some examples, the determining of subsets is performed by searching a hash table that stores the partitioning strategy information, including: attributes, identification of which attributes are key attributes, subsets corresponding to each attribute, tables corresponding to the subsets, and the status of each table (e.g., on hold or active). In some examples, the hash table is stored as part of, or in association with, the dynamic partition layer. If, for example, twenty-six subsets are defined for the "LastName" attribute in the partitioning strategy, each subset corresponding to a different letter of the alphabet, then the data value "Smith" is determined by the data partition layer to correspond to the "S" subset. Next, the data partition layer determines the active table corresponding to the "S" subset. For example, if there are three tables associated with the subset, the data partition layer identifies which of the three tables is marked as active. Accordingly, the data partition layer identifies the active table of the "S" subset, which is selected as the table for storing the "Smith" data value.

The insert statement is transformed by the dynamic partition layer, such that the active table for storing the data values is specified in the transformed insert statement. For example, if the active table corresponding to the "S" subset is S.a, then the insert statement is transformed to the following: INSERT INTO S.a (LastName) VALUES ('Smith'). In some examples, the insert statement is transformed by generating a new insert statement. In other examples, the insert statement transformed by replacing portions of the insert statement without generating an entirely new insert statement.

At block 212, the dynamic partition layer attempts to detect a trigger event corresponding one or more tables. In some examples, a trigger event is one or more of the following: exceeding a pre-configured number of records; exceeding a pre-configured table size; and exceeding a pre-configured index size. If a trigger event is detected, then processing continues at block 216. If a trigger event is not detected, then processing continues at block 214. Trigger events may be specified in alternate ways. In some examples, a trigger event could be meeting or exceeding the pre-configured threshold (e.g., if a table is at or above the threshold, do not store data in the table). In other examples, a trigger event also could be rewritten in alternate form, for example as determining that a table does not exceed the pre-configured threshold (e.g., if a table does not exceed the threshold, then continue to store data in the table). In some examples, the trigger event is detected prior to transforming an insert statement. For example, upon determining the active table, the dynamic partition layer may attempt to detect a trigger event, prior to transforming the insert statement to specify the active table.

At block 214, based on the detecting performed regarding the trigger event (e.g., the size threshold is detected to not be exceeded for the active table), the transformed insert statement is executed and the data value(s) are stored in the active table. For example, when the INSERT INTO S.a (LastName) VALUES ('Smith') statement is executed, the data value "Smith" is inserted into the S.a table. In some examples, the executing of the insert statement may be performed by a database management system that receives the transformed insert statement from the dynamic partition layer.

At block 216, based on the detecting regarding the trigger event (e.g., the size is determined to be exceeded for the active table), the active table is placed on hold, meaning that the table is marked such that the data partition layer identifies that the table is not available for storing data. A second table, S.b, is created if it does not already exist. The second table, S.b, is marked active, such that the data partition layer identifies that the second table is the table where data values are to be stored for the particular subset. The marking of the tables as active or on hold is performed by the dynamic partition layer, which may use a data structure such as a hash table to mark and identify the status of each table in the database. Accordingly, as tables in the subset are filled, new tables (e.g., a second table, third table, fourth table, and so forth) are activated to store data that is inserted.

At block 218, the insert statement is transformed in a similar manner as performed in steps 208 and 210, by parsing the insert statement and transforming the insert statement to specify the active table for storing the data values. In this example, the insert statement is transformed to identify that the second table is the table for storing the data values, because the second table is the table that is marked as active. For example, if the received insert statement is: INSERT INTO Customers (LastName) VALUES ('Smith') and the second table created is S.b, then the insert statement is transformed to the following: INSERT INTO S.b (LastName) VALUES ('Smith'). In some examples, the detecting of a trigger event may be performed prior to attempting to insert the data values into the table in a similar manner as performed in step 212. In other examples, the data partition layer may assume that the table is acceptable for inserting data values if the table is newly created (e.g., the table would not exceed a threshold as no values have been inserted yet).

At block 214, the transformed insert statement is executed, such as by passing the transformed insert statement to a database management system that executes the transformed insert statement, and the data value(s) are stored in the database table. For example, when the INSERT INTO S.b (LastName) VALUES ('Smith') statement is executed, the data value "Smith" is inserted into the S.b table. Accordingly, vertical partitioning is implemented by the dynamic partition layer, to partition data values corresponding to the "S" subset of the LastName attribute into a plurality of different database tables.

Figure 3:
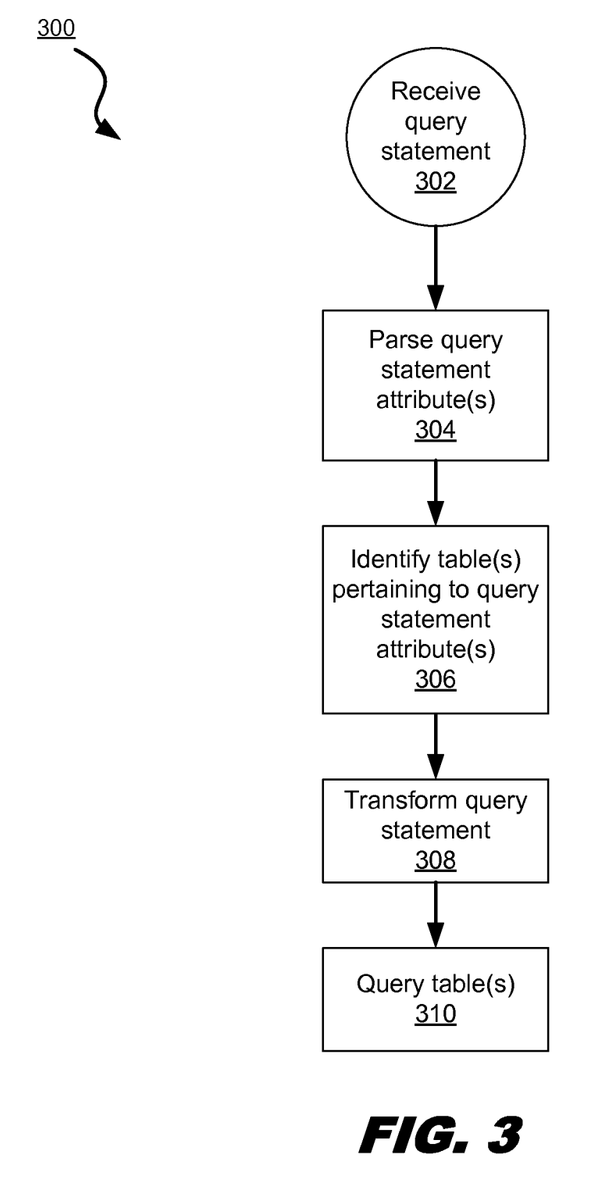
FIG. 3 is a flow diagram illustrating a method for querying a database, in accordance with various examples of the present disclosure.

FIG. 3 is a flow diagram illustrating a method for querying a database, according to some examples of the present disclosure. The method 300 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

At block 302, the dynamic partition layer receives a query statement. For example, if the enterprise application is attempting to query a Customers table, and the database is an SQL database, the dynamic partition layer may receive the following query statement: SELECT LastName FROM Customers.

At block 304, the query statement is parsed by the dynamic partition layer to identify one or more attributes included in the query statement. For example, "LastName" may be identified as an attribute.

At block 306, the parser then identifies, for each attribute, the tables corresponding to the attribute. This may be performed by, for example, at the dynamic partition layer performing a lookup using a hash table, where the hash table stores the attributes, the subsets assigned to each attribute and the tables corresponding to the subsets. For example, if the attribute is "LastName," the dynamic partition layer may perform a lookup on the hash table and identify that the attribute corresponds to two subsets (e.g., a first subset may be defined for last names beginning with letters from A to K and a second subset may be defined for last names beginning with letters from L to Z). The dynamic partition layer may further identify that the first subset is associated with two tables (S1_1, S1_2) and the second subset is associated with three tables (S2_1, S2_2, S2_3).

At block 308, the query statement is transformed by the dynamic partition layer to specify the identities of the tables determined by the dynamic partition layer. For example, if the table names are S1_1, S1_2, S2_1, S2_2, S2_3, as per the above example, the query statement may be transformed to: SELECT LastName FROM S1_1, S1_2, S1_1, S1_2, S1_3. In another example, where query attributes do not allow the query to be limited to one or a few tables, the query may be transformed such that the tables are all queried and the results combined using a UNION operator.

At block 310, the transformed query statement is executed, such as by passing the transformed query statement to a database management system that executes the transformed query statement, in order to query the identified tables, and the results are returned to the enterprise application.

Figure 4:
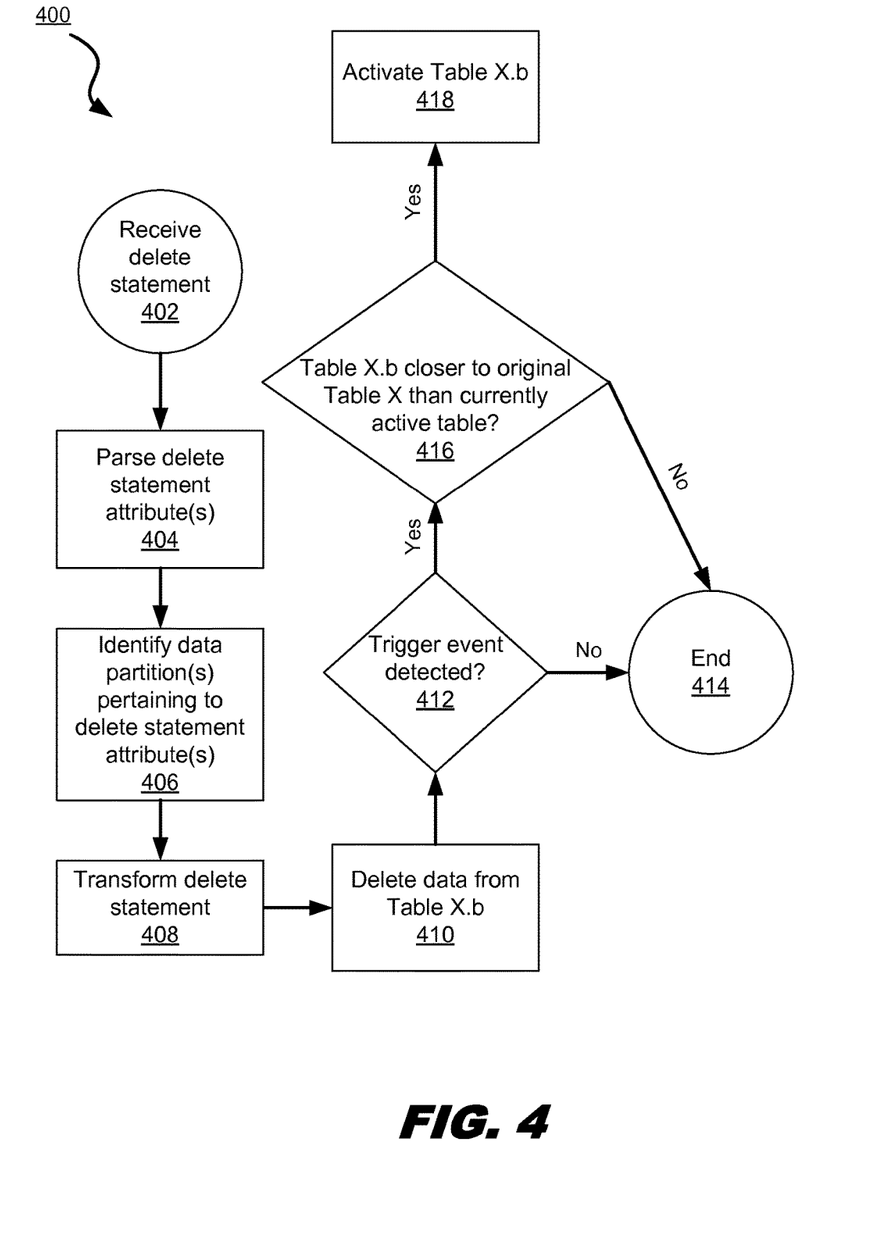
FIG. 4 is a flow diagram illustrating a method for deleting data from a database, in accordance with various examples of the present disclosure.

FIG. 4 is a flow diagram illustrating a method for deleting data from a database, according to some examples of the present disclosure. The method 400 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

At block 402, the dynamic partition layer receives a delete statement. For example, if the enterprise application is attempting to delete a customer from a Customers table, and the database is an SQL database, the dynamic partition layer may receive the following query statement: DELETE FROM Customers WHERE LastName='Smith.'

At block 404, the query statement is parsed by a data partition layer to identify one or more attributes included in the query statement. For example, "LastName" may be identified as an attribute.

At block 406, the parser then identifies, for each attribute, the tables corresponding to the attribute. The dynamic partition layer may identify the tables by performing a hash table lookup, where the hash table stores the attributes, the subsets assigned to each attribute and the tables corresponding to the subsets. For example, if the attribute is "LastName," the dynamic partition layer may perform a lookup on the hash table to identify that the attribute corresponds to two subsets (e.g., a first subset may be defined by the partitioning strategy for last names beginning with letters from A to K and a second subset may be defined by the partitioning strategy for last names beginning with letters from L to Z). The dynamic partition layer may further identify from the hash table that the first subset is associated with three tables (Y, Y.a, Y.b) and the second subset is associated with four tables (X, X.a, X.b, X.c). The dynamic partition layer may then determine that the "Smith" data value is associated with the second subset, based on "Smith" matching the partitioning strategy rule that data values beginning with letters from L to Z are stored in the second subset. The matching may be performed by looking up the partitioning strategy rule in the hash table at the dynamic partition layer.

At block 408, the delete statement is transformed by the dynamic partition layer to specify the identities of the tables determined by the dynamic partition layer. For example, if the tables in the subset storing the data value are determined to be X, X.a, X.b and X.c, as per the above example, the delete statement may be transformed to: DELETE FROM X,X.a,X.b,X.c WHERE LastName='Smith.'

At block 410, the transformed delete statement is executed on the specified tables to delete the data value(s) identified in the transformed delete statement. In some examples the transformed delete statement is passed to a database database management system that executes the transformed delete statement. If the transformed delete statement corresponds to all of the data values in a table or tables, the delete statement may instead be replaced by a "drop table" statement, which deletes the entire table(s) rather than deleting each of the data values individually from the table(s).

At block 412, the dynamic partition layer attempts to detect a trigger event corresponding to the table(s) from which data is deleted. In the present example, assume that upon executing the DELETE FROM X,X.a,X.b,X.c WHERE LastName='Smith' statement, a data value is deleted from the X.b table. The dynamic partition layer therefore determines whether a trigger event exists regarding the X.b table.

In some examples, a trigger event is one or more of the following: not exceeding a pre-configured number of records; not exceeding a pre-configured table size; and not exceeding a pre-configured index size. If a trigger event is detected, then processing continues at block 416. If a trigger event is not detected, then processing continues at block 414. Trigger events may be specified in alternate ways. In some examples, a trigger event could be that a threshold is met or not exceeded. In other examples, the logic for the trigger event could be written in alternate form, such as specifying that processing continues at block 414 if the threshold is exceeded, otherwise processing continues at block 416. In the present example, the trigger event is not exceeding a pre-configured table capacity. In this example, if the table is determined to be less than 20% filled to capacity, then processing continues at block 416, otherwise processing continues at block 414.

At block 414, if the trigger event is determined to not be met (e.g., the table is not less than 20% filled to capacity), processing is completed at 414.

At block 416, if the trigger event is detected, such that it is determined that the table X.b does not exceed a threshold (e.g., the X.b table is less than 20% filled to capacity). In the present example, X is the original table and X.c is the currently active table for the subset. In the present example, the dynamic partition layer determines whether the table that the data values were deleted from (X.b) is closer to the original table (X) than the currently active table (X.c). Closeness to the original table refers to the order in which the tables were created, with earlier created tables in a subset being "closer" to the original table and later created tables in the subset being "farther" from the original table. In an example, the second subset includes an original table X, a table X.a that was created after table X, a table X.b that was created after table X.a, and table X.c that was created after table X.b. Accordingly, the tables ranked in order of closeness to table X are: X, X.a, X.b, X.c.

In the present example, the data value is deleted from X.b and the trigger event is detected with regard to table X.b. Accordingly, since table X.b is closer to the original table (X) than X.c is, processing continues at block 418.

At block 418, the currently active table (X.c) for the subset on which the delete statement was executed is placed on hold, and the table that the delete was performed upon (X.b) is marked active. In the present example, X.c is therefore marked as on hold and X.b is therefore marked as active. Accordingly, the next insert statement for the subset will be transformed to insert data into the table that is marked active (which in this example is X.b). In other words, tables that were previously determined to be full may later be determined to have room to store additional data. Therefore, earlier created tables may re-activated in order to resume inserting data into those table.

At block 414, if the table that the data values were deleted from is not closer to the original table, then processing is determined to be complete. For example, if the data were deleted from X.c rather than X.b, then X.c remains as the active table, since X.c is not closer to X. Similarly, for example, if the active table is instead X.a, deleting data values from X.b would not cause X.b to become the active table, since X.a is closer to the original table X.

Figure 5:
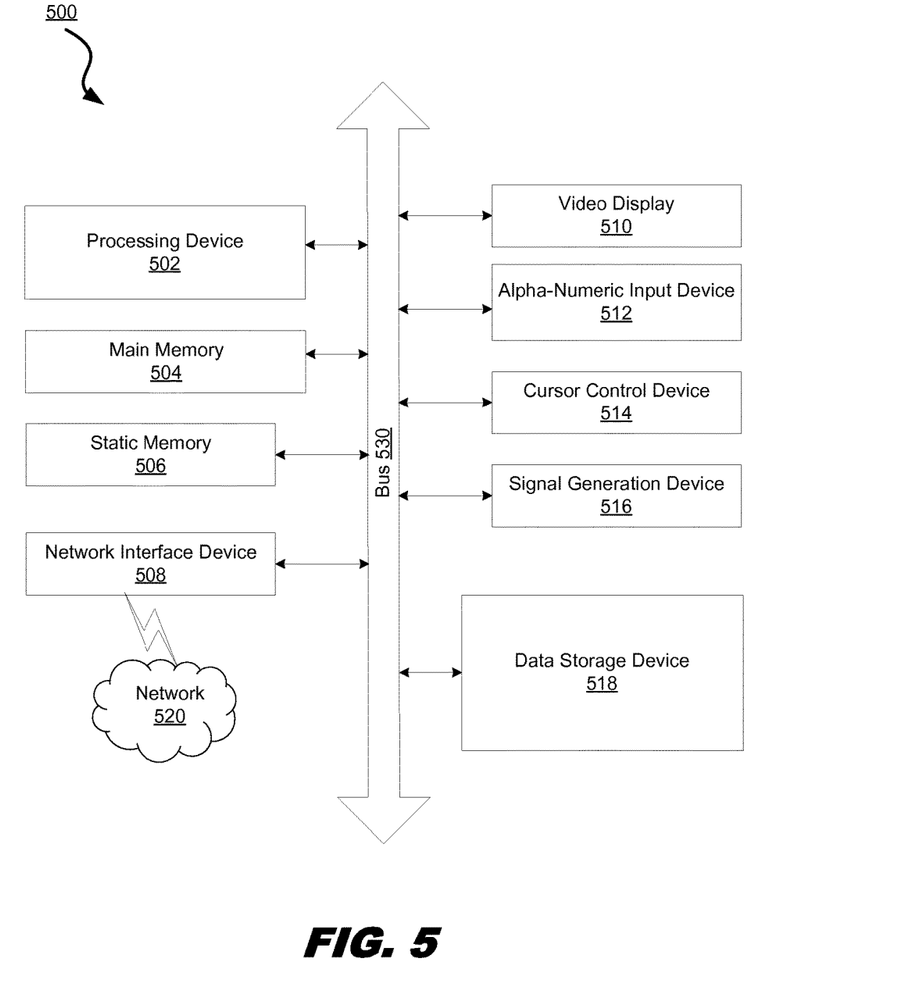
FIG. 5 is a block diagram illustrating a computer system that may perform one or more of the operations described herein.

FIG. 5 illustrates a diagram of a machine in the form of a computer system 500 within which a set of instructions, for causing the machine to perform any one or more of the methodologies discussed herein, may be executed. In other examples, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

Computer system 500 includes processing device (processor) 502, main memory 504 (e.g., read-only memory (ROM), flash memory, dynamic random access memory (DRAM) such as synchronous DRAM (SDRAM), double data rate (DDR SDRAM), or DRAM (RDRAM), and so forth), static memory 506 (e.g., flash memory, static random access memory (SRAM), and so forth), and data storage device 518, which communicate with each other via bus 530.

Processor 502 represents one or more general-purpose processing devices such as a microprocessor, central processing unit, or the like.

More particularly, processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute instructions for performing the operations and steps discussed herein.

Computer system 500 may further include network interface device 508.

Computer system 500 also may include video display unit 510 (e.g., a liquid crystal display (LCD) or a cathode ray tube (CRT)), alphanumeric input device 512 (e.g., a keyboard), cursor control device 514 (e.g., a mouse), and signal generation device 516 (e.g., a speaker).

Data storage device 518 may include a computer-readable storage medium on which is stored one or more sets of instructions (e.g., software) embodying any one or more of the methodologies or functions described herein. The instructions may also reside, completely or at least partially, within main memory 504 and/or within processor 502 during execution thereof by computer system 500, main memory 504 and processor 502 also constituting computer-readable storage media. The instructions may further be transmitted or received over network 520 via network interface device 508.

While data storage device 518 is shown in an example to be a single medium, the term "data storage device" should be taken to include a single medium or multiple media (e.g., a centralized or distributed database, and/or associated caches and servers) that store the one or more sets of instructions.

The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "measuring," "generating," "setting," "performing," "computing," "comparing," "applying," "creating," "ranking," "classifying," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A computer-implemented method for dynamically partitioning and storing data, the method comprising:
   creating a first table in a database, the first table corresponding to data values that are members of a first subset of a plurality of subsets corresponding to an attribute;
   receiving a first insert statement including a first data value that is a member of the first subset;
   transforming the first insert statement to insert the first data value into the first table;
   receiving a second insert statement including a second data value that is a member of the first subset;
   based on detecting a trigger event corresponding to the first table, creating a second table in the database, the second table corresponding to data values that are members of the first subset; and
   transforming the second insert statement, the transforming comprising:
      parsing the second insert statement to identify the attribute and the second data value;
      determining that the second data value is a member of the first subset;
      identifying the second table as an active table corresponding to the first subset; and
   modifying the second insert statement to insert the second data value into the second table.

2. The method of claim 1, wherein transforming the first insert statement comprises:
   parsing the first insert statement to identify the attribute and the first data value;
   determining that the first data value is a member of the first subset;
   identifying an active table corresponding to the first subset, wherein the first table is the active table; and
   modifying the first insert statement to indicate that the first data value is to be inserted into the first table.

3. The method of claim 1, wherein the trigger event corresponds to the first table having or exceeding at least one of the following: a pre-configured number of records; a pre-configured table size; or a pre-configured index size.

4. The method of claim 1, wherein creating the second table in the database further comprises:
   placing the first table on hold; and
   marking the second table as active.

5. The method of claim 1, wherein the first table includes a first vertical partition corresponding to the first subset and the second table includes a second vertical partition corresponding to the first subset.

6. The method of claim 1, wherein each subset of the plurality of subsets includes a horizontal partition corresponding to the attribute, wherein the first subset includes a first horizontal partition, and wherein the first table and the second table are members of the first horizontal partition.

7. The method of claim 1, further comprising:
   defining the attribute as a key attribute.

8. The method of claim 1, further comprising:
   deleting one or more data values from the first table;
   determining a first closeness between the first table and an original table;
   determining a second closeness between the second table and the original table;
   determining that the first closeness is less than the second closeness;

detecting that the first table is less than or equal to a pre-configured minimum table size, number of records, or index size;

placing the second table on hold; and marking the first table as active.

9. The method of claim 1, further comprising:

creating a table corresponding to each subset of the plurality of subsets, wherein a hash table identifies tables that correspond to each subset of the plurality of subsets.

10. A non-transitory computer-readable medium having stored thereon computer-readable instructions executable to cause a machine to perform operations comprising:

receiving a first insert statement including a first data value that is a member of a first subset;

transforming the first insert statement to insert the first data value into a first table;

detecting a trigger event corresponding to the first table;

creating a second table corresponding to data values that are members of the first subset;

receiving a second insert statement including a second data value that is a member of the first subset; and transforming the second insert statement, the transforming comprising:

parsing the second insert statement to identify the attribute and the second data value;

determining that the second data value is a member of the first subset;

identifying the second table as an active table corresponding to the first subset; and modifying the second insert statement to insert the second data value into the second table.

11. The non-transitory computer-readable medium of claim 10, wherein the trigger event includes at least one of the following: meeting or exceeding a pre-configured number of records; meeting or exceeding a pre-configured table size; or meeting or exceeding a pre-configured index size.

12. The non-transitory computer-readable medium of 10, wherein creating the second table further comprises:

marking in a hash table that the first table is on hold; and marking in the hash table that the second table is active.

13. The non-transitory computer-readable medium of claim 10, wherein the first table includes a first vertical partition corresponding to the first subset and the second table includes a second vertical partition corresponding to the first subset.

14. The non-transitory computer-readable medium of claim 10, wherein the first subset includes a horizontal partition corresponding to the attribute, and wherein the first table and the second table are members of the horizontal partition.

15. A system including a non-transitory memory and one or more hardware processors coupled to the non-transitory memory to execute instructions to perform operations comprising:

storing, in a first table of a database, data values that are members of a first subset of a plurality of subsets corresponding to an attribute;

receiving a first insert statement, the first insert statement including a first data value that is a member of the first subset;

transforming the first insert statement;

detecting a trigger event corresponding to the first table;

receiving a second insert statement, the second insert statement including a second data value that is a member of the first subset; and transforming the second insert statement, the transforming comprising:

parsing the second insert statement to identify the attribute and the second data value;

determining that the second data value is a member of the first subset;

identifying a second table of the database as an active table corresponding to the first subset; and modifying the second insert statement to insert the second data value into the second table.

16. The system of claim 15, wherein the trigger event includes at least one of the following: meeting or exceeding a pre-configured number of records; meeting or exceeding a pre-configured table size; or meeting or exceeding a pre-configured index size.

17. The system of claim 15, wherein the first table includes a first vertical partition corresponding to the first subset and the second table includes a second vertical partition corresponding to the first subset.

18. The system of claim 15, wherein each subset of the plurality of subsets includes a horizontal partition corresponding to the attribute, wherein the first subset includes a first horizontal partition, and wherein the first table and the second table are members of the first horizontal partition.

19. The system of claim 15, wherein the operations further comprise providing a cache of partitioning data associated with a business key functionality module.

20. The method of claim 1, further comprising:

defining the plurality of subsets corresponding to the attribute.

* * * * *